Feb. 22, 1927.
C. BERG
TIRE RIM
Filed April 26, 1924
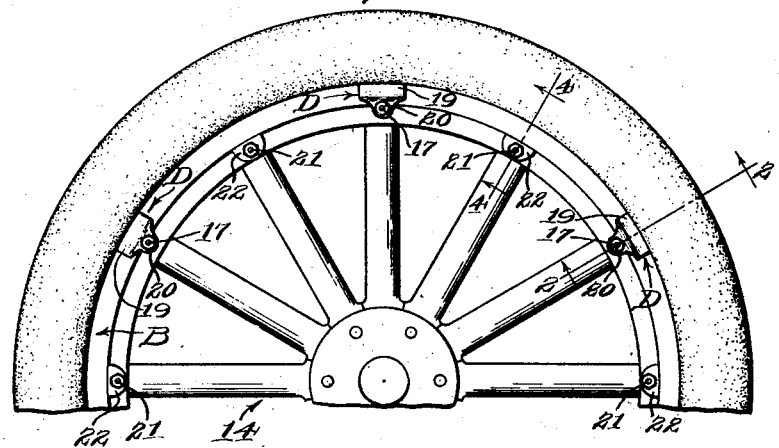
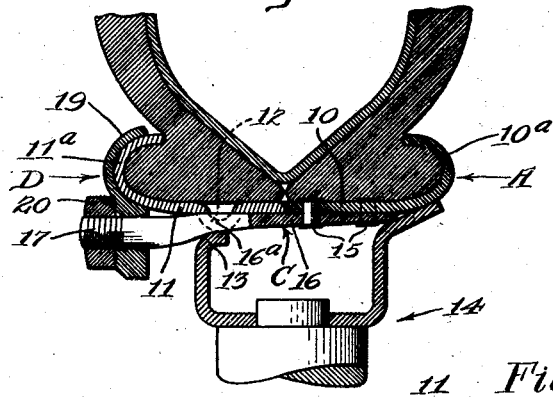
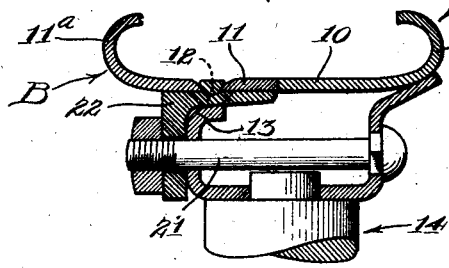
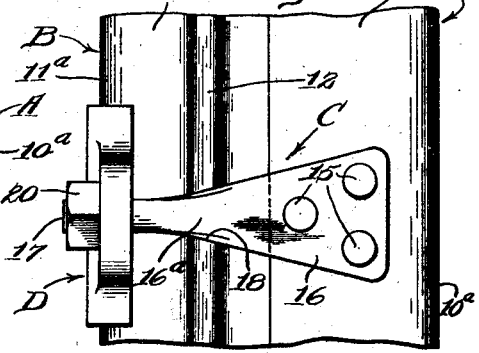
Inventor
Charles Berg
By Bradbury & Cauwell
Attorneys Patented Feb. 22, 1927.

1,618,403

UNITED STATES PATENT OFFICE.

CHARLES BERG, OF MINNEAPOLIS, MINNESOTA, ASSIGNOR OF ONE-HALF TO VICTOR HOBART, OF MINNEAPOLIS, MINNESOTA.

TIRE RIM.

Application filed April 26, 1924. Serial No. 709,096.

My invention relates to improvements in tire-rims of the demountable type for clincher and straight-side pneumatic tires.

The application of pneumatic tire casings to and the removal thereof from the ordinary solid, one piece tire-rims, is often difficult not only on the road and in the private garage, but in the tire shops where special tools for the purpose are to be had.

An object of my invention is to provide an improved demountable tire-rim retaining those features of the conventional tire-rim making for ease of application and removal from a wheel, durability and security in use, and low cost of construction, yet permitting of the circumferential separation of the tire-rim to allow for the ready removal thereof from and the application thereof to a tire casing.

With the foregoing and other objects in view, which will appear in the following description, the invention resides in the novel combination and arrangement of parts and in the details of construction hereinafter described and claimed.

In the drawings, Fig. 1 is a fragmentary elevational view of an automobile wheel equipped with a tire-rim embodying my invention, said rim, in turn, being supplied with a tire of conventional design; Fig. 2 is an enlarged fragmentary sectional view taken as on the line 2—2 of Fig. 1; Fig. 3 is a detail view of a portion of the tire-rim as would be seen in looking upward at the under side of that part of the rim shown in Fig. 2 and Fig. 4 is a view similar to that of Fig. 2, the same being taken as on the line 4—4 of Fig. 1.

Referring to the drawing, it will be observed that my improved tire-rim includes inner and outer circumferentially abutting sections A and B, the inner section A comprising an annular body portion 10 with a tire engaging flange 10ª thereon and the outer section comprising a similar body portion 11 and tire engaging flange 11ª. The body portion 11 of the section B is formed with a circumferential bead 12 on the inner periphery thereof, said bead forming a bearing at the outer side of the rim for engagement, as is usual, with the felly 13 of a wheel 14. Except for the dividing of the tire-rim into sections, the structure thus far explained is similar to the one-piece, solid tire-rim in common and extensive use.

To the inner periphery of the body 10 of the rim section A, I secure a plurality of coupling members C as by means of rivets 15, spot welding, or otherwise. These members C, reaching laterally outward from the section A, each comprises a relatively wide butt 16 tapered to form a narrowing shank 16ª that terminates in a threaded tip 17. In the bead 12 of the outer rim section B are a plurality of grooves 18, one for each coupling member C, said grooves diverging inwardly of the section B to correspond with the taper of the shank 16ª of its respective member C. Aside from snugly fitting the grooves 18 at the sides thereof, the shanks 16ª of the coupling members C, snugly bear at their outer surfaces against the inner periphery of the rim section B. With the parts thus arranged, it will be readily observed that, with the sections A, B fitted together (Fig. 2), said sections are held in axial alignment and secured in fixed circumferential relation. In this connection, attention is invited to the ample stock in the shanks 16ª of the coupling members C and further, to the fact that the thickness of this stock is entirely embraced in depth of the grooves 18 in the bead 12 of the outer rim sections B, whereby the conventional dimensions of rims and fellies are undisturbed.

Slidable on the threaded tips 17 of the coupling members C are clips D. These clips D may be secured to the rim section B, or not, as desired. In the latter event the extremities 19 of said clips are sufficiently long and curved to correspond with the flange 11ª so that a firm and secure grip can be maintained by the clips D upon said flange. Threaded on the tips 17 and abutting against the clips D are nuts 20, the same co-operating with said clips to clamp the rim sections A, B firmly together as shown in Fig. 2.

In use, the assembled tire-rim is secured in place upon a wheel by means of the usual felly bolts 21 passing through the ordinary rim lugs 22, which, in the present structure, are fixed to the outer rim section B. With a tire-rim upon a wheel, these bolts 21 and lugs 22 co-operate with the felly 13 to aid in holding the rim sections A, B together, but when removed from a wheel, as is permitted by said bolts 21, the clamping members C, clips D and nuts 20 serve effectively as a tie for said rim sections A, B. To permit of the ready removal of a tire casing from the rim, it is only necessary to take the nuts 20 from the clamping members C, whereupon the sections A, B are easily separated and the casing freed. In applying a casing to the rim, the sections A, B are conveniently assembled to embrace the beads of the casing, the rim with tire applied being thereafter handled in its application to a tire rack or to a wheel with the same convenience as the ordinary tire-rim.

Changes in the specific form of my invention, as herein disclosed, may be made within the scope of what is claimed without departing from the spirit of my invention.

Having described my invention, what I claim as new and desire to protect by Letters Patent is:

1. A tire-rim comprising inner and outer abutting rim sections, each including a body portion formed with a tire engaging flange thereon, the latter additionally including a circumferential felly engaging bead on the inner periphery of the body thereof, said bead having spaced lateral grooves, the sides thereof diverging inwardly of said section, coupling members reaching laterally outward from the inner rim section, said members being arranged to snugly engage within the outer rim section and formed to fit entirely within the depth of said diverging grooves for guiding said outer rim section into abutting relation with respect to the inner rim section and for providing for axial alignment and fixed circumferential relation between the sections, nuts threaded on the coupling members, and clips slidable upon and removable from said members, said clips being formed to embrace the tire engaging flange of said outer rim, and nuts threaded on said members to co-operate with said clips and clamp the two sections together.

2. A tire-rim comprising inner and outer abutting rim sections, each including a body portion formed with a tire engaging flange thereon, the latter additionally including a circumferential felly engaging bead on the inner periphery of the body thereof, said bead having spaced lateral grooves, the sides thereof, diverging inwardly of said section, coupling members reaching laterally outward from the inner rim section, said members being arranged to snugly engage within the outer rim section and formed to fit said diverging grooves for guiding said outer rim section into abutting relation with respect to the inner rim section and for providing for axial alignment and fixed circumferential relation between the sections, nuts threaded on the coupling members, and clips associated with said outer rim section and co-operating with said nuts to clamp the two sections together.

3. A tire-rim comprising inner and outer abutting rim sections, each including a body portion formed with a tire engaging flange thereon, the latter additionally including a circumferential felly engaging bead on the inner periphery of the body thereof, said bead having spaced lateral grooves therein, coupling members reaching laterally outward from the inner rim section, said members being arranged to snugly engage within the outer rim section and formed to fit the grooves in the bead thereon for guiding said outer rim sections into abutting relation with respect to the inner rim section and for providing for axial alignment and fixed circumferential relation between the sections, and means co-operating with the outer ends of said members and with said outer rim section to detachably clamp the two sections together.

4. A tire rim comprising inner and outer abutting rim sections, each including a body portion formed with a tire engaging flange thereon, one of said rim sections having a plurality of coupling members secured thereto and extending outwardly beyond the same, the other of said members being provided with raised portions along the inner surface thereof, forming grooves for the reception of said coupling members adapted to engage the sides thereof and to guide the members in being assembled, and to prevent relative rotation thereof, and means co-operating with said coupling members for clamping said rim sections together.

In testimony whereof, I have signed my name to this specification.

CHARLES BERG.